(12) United States Patent
Cao

(10) Patent No.: US 10,629,868 B2
(45) Date of Patent: Apr. 21, 2020

(54) BATTERY MODULE AND END PLATE OF THE BATTERY MODULE

(71) Applicant: Contemporary Amperex Technology Co., Ningde, Fujian (CN)

(72) Inventor: Gen Cao, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 141 days.

(21) Appl. No.: 15/657,797

(22) Filed: Jul. 24, 2017

(65) Prior Publication Data

US 2018/0212212 A1 Jul. 26, 2018

(30) Foreign Application Priority Data

Jan. 20, 2017 (CN) .......................... 2017 1 0048499

(51) Int. Cl.
*H01M 2/10* (2006.01)
*H01M 10/04* (2006.01)

(52) U.S. Cl.
CPC ....... *H01M 2/1016* (2013.01); *H01M 2/1005* (2013.01); *H01M 10/0481* (2013.01)

(58) Field of Classification Search
CPC .............................. H01M 2/1016; H01M 2/00
See application file for complete search history.

(56) References Cited

U.S. PATENT DOCUMENTS

| 2004/0137299 | A1* | 7/2004 | Mazza | ................ | H01M 8/0206 |
| | | | | | 429/514 |
| 2008/0118819 | A1* | 5/2008 | Gamboa | ............ | H01M 2/0245 |
| | | | | | 429/61 |
| 2011/0151299 | A1 | 6/2011 | Park et al. | | |
| 2011/0151312 | A1 | 6/2011 | Kim | | |

(Continued)

FOREIGN PATENT DOCUMENTS

| CN | 102623736 A | 8/2012 |
| CN | 102842693 A | 12/2012 |
| CN | 203325984 U | 12/2013 |

(Continued)

OTHER PUBLICATIONS

Extended European Search Report for European Application No. 17179091.8, dated Aug. 28, 2017.

(Continued)

*Primary Examiner* — Osei K Amponsah
(74) *Attorney, Agent, or Firm* — Law Offices of Liaoteng Wang

(57) ABSTRACT

The present application relates to a battery module and an end plate of the battery module. The end plate includes a body and connecting plates connected to edges of the body. The body has a different material from that of the connecting plate. The connecting plates extend along a height direction of the battery module. The body is fixedly connected to side plates of the battery module through the connecting plates. When the end plate is designed, the body can utilize a lower density material, so that the thickness of the body can be (Continued)

appropriately increased, which enables the case of the battery module to be not easily deformed due to the battery's expansion force. Further, the connecting plate can employ a material capable of improving the weld strength between the end plates and the side plates.

16 Claims, 4 Drawing Sheets

(56) References Cited

U.S. PATENT DOCUMENTS

2014/0134462 A1  5/2014  Choi et al.
2016/0133891 A1  5/2016  Nam et al.

FOREIGN PATENT DOCUMENTS

CN   204271149 U   4/2015
CN   106299187 A   1/2017

OTHER PUBLICATIONS

The First Official Action and search report dated Sep. 30, 2018 for Chinese application No. 201710048499.7, 6 pages.
The Second Office Action and supplementary search report dated May 5, 2019 for Chinese Application No. 201710048499.7, 7 pages.

* cited by examiner

BATTERY MODULE AND END PLATE OF THE BATTERY MODULE

CROSS-REFERENCE TO RELATED APPLICATION

This application is based on and claims priority to Chinese Patent Application No. 201710048499.7 filed on Jan. 20, 2017, which is incorporated herein by reference in its entirety.

TECHNICAL FIELD

The present application relates to the field of battery technology, and more particularly to a battery module and end plate of the battery module.

BACKGROUND

A batter module has a case, which is one of core components of the battery module, and the interior of which forms a space for accommodating battery cells. The case of a conventional battery module mainly includes a pair of side plates, a pair of end plates, a bottom plate and a top plate. The side plates and end plates mainly employ the following two structural forms.

In a first form, the side and end plates both are made of aluminum plates and are welded together. By adopting this structure, the weld strength between the side plates and the end plates is relatively low, resulting in a poor structural reliability of the battery module.

In a second form, the side and end plates both are made of steel plates and are welded together. Since steel plates are relatively heavy, the thickness of side and end plates are typically thin with less rigidity, causing the case of the battery module easily to be deformed due to the battery's expansion force.

SUMMARY

The present application provides a battery module and its end plate in order for improving the structural reliability of the battery module, while preventing the case of the battery module from being deformed due to the battery's expansion force.

According to a first aspect of the present application, an end plate of a battery module is provided. The end plate comprises a body and connecting plates connected to edges of the body, wherein the body has a different material from that of the connecting plates, the connecting plates extend along a height direction of the battery module, and the body is fixedly connected to side plates of the battery module through the connecting plates.

According to a second aspect of the present application, a battery module is provided. The battery module comprises side plates and end plates, wherein the end plates are fixedly connected to the side plates, and the end plates are implemented as the end plate of the battery module according to any of the above items.

It is to be understood that both the foregoing general descriptions and the following detailed descriptions are only exemplary, and are not intended to limit the present application.

REFERENCE LABELS IN THE DRAWINGS

Figure 1:
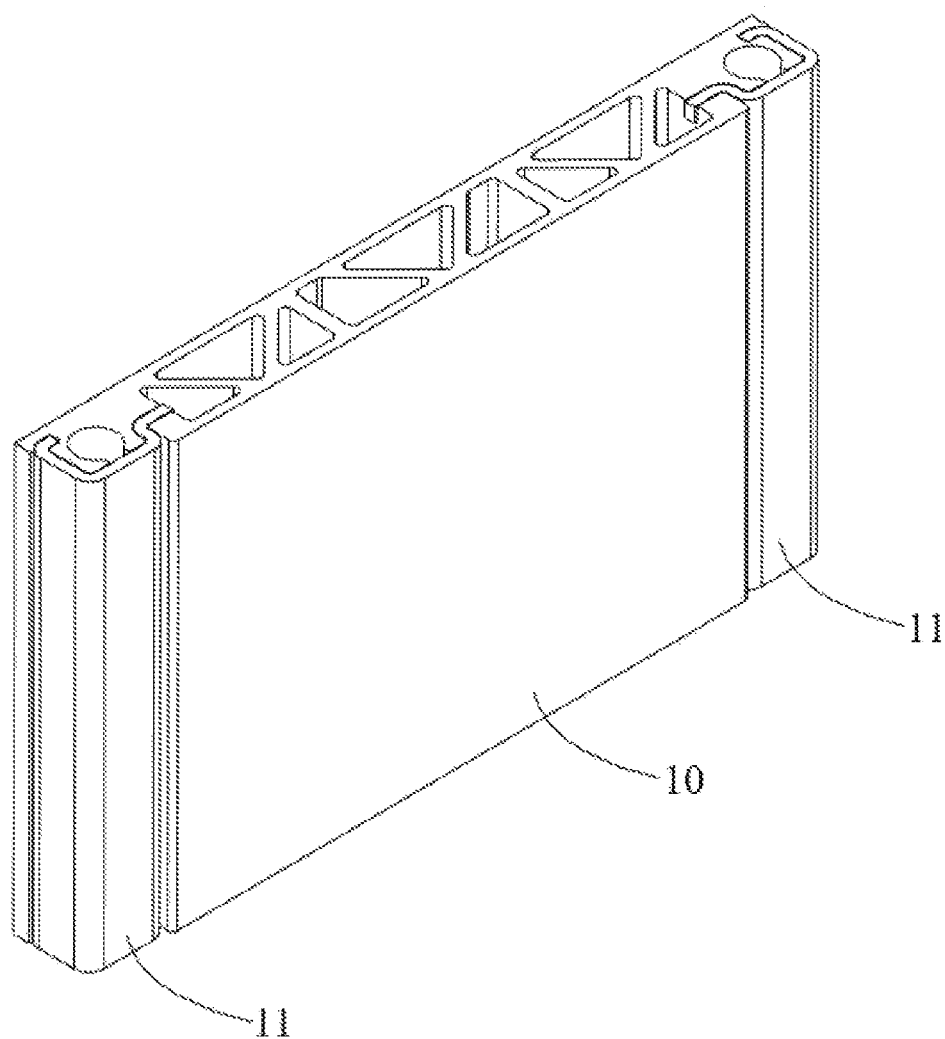
FIG. 1 is a structural schematic diagram of an end plate of a battery module provided in an embodiment of the present application.
Figure 2:
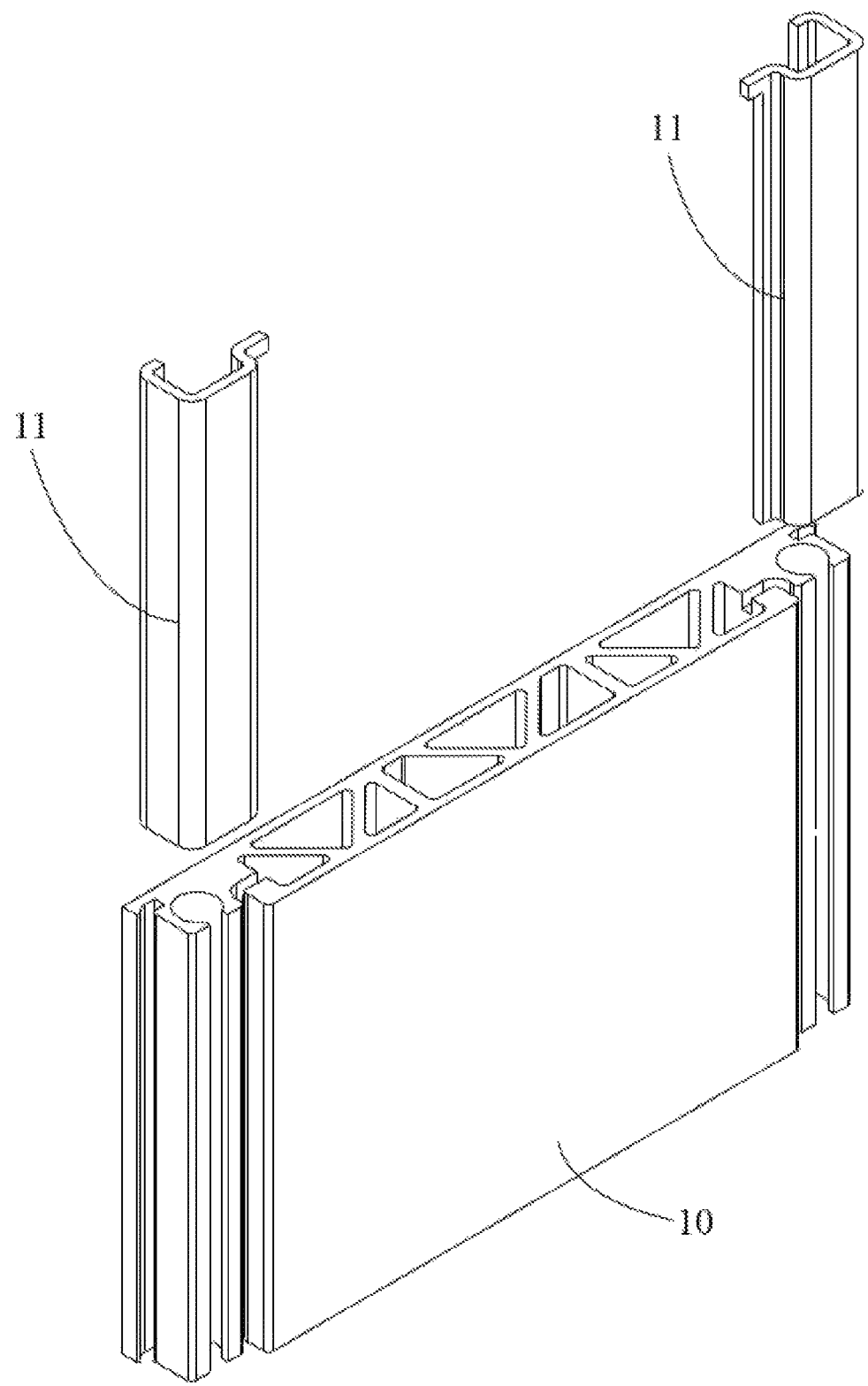
FIG. 2 is an exploded view of the structure illustrated in FIG. 1.

10—body;
100—first side surface;
101—second side surface;
102—first groove;
103—second groove;
103a—longitudinal groove segment,
103b—lateral groove segment;
104—limiting groove;
11—connecting plate;
110—first inserted portion,
111—first exposed portion,
112—second exposed portion,
113—second inserted portion,
114—limiting protrusion;
20—side plate;

The drawings provided herein, which are incorporated in and constitute a part of the specification, illustrate embodiments consistent with the present application, and serve to explain the principles of the present application together with the description.

DETAILED DESCRIPTION

The present application will be further described in detail below by way of specific embodiments and in conjunction with the accompanying drawings.

As shown in FIGS. 1-7, the embodiments of the present application provide an end plate of a battery module, which may be fixedly connected to side plates 20 of the battery module. The end plate of the battery module includes a body 10 and connecting plates 11 which are connected to edges of body 10. The edges of body 10 refer to the edges of body 10 close to the side plates 20 and are located at connecting positions between the entire end plate and the side plates 20 of the battery module. With respect to a single end plate of the battery module, there are typically two positions which are needed to be connected to side plates 20. Thus, there may be two connecting plates 11, which are connected to two opposite edges of the body 10 respectively.

The body 10 is mainly used to bear the battery's expansion force, provide mounting holes of the battery module and so on. The body 10 has a different material from that of connecting plates 11, so that materials of the body 10 and the connecting plates 11 can be selected individually as needed without being limited by the structure of the end plates of the battery module. The connecting plates 11 extend along a height direction of the battery module (i.e., Z and –Z directions as shown in the coordinate system in FIG. 7), and the body 10 is fixedly connected to the side plates 20 through the connecting plates 11. In particular, the connecting plates 11 may be fixed to the side plates 20 by laser welding.

In an embodiment where the above end plate of the battery module is adopted, when the end plate of the battery module is designed, the body 10 may employs a lower density material, that is, the density of body 10 is less than the density of the connecting plates 11. On a premise of meeting a weight requirement, the thickness of the body 10 may be appropriately increased to improve rigidity of the end plate of the battery module, enabling the case of the battery module not easily to be deformed due to the battery's expansion force. Meanwhile, the connecting plates 11 may employ a material capable of improving the weld strength between the end plate and side plates 20 of the battery module, thereby improving the structural reliability of the batter module.

In an alternative embodiment, the body 10 may be made of aluminum, the connecting plates 11 may be made of steel, and side plates 20 may be steel plates. With such a design, it can be ensured that the body 10 has required weight on the premise of having a larger thickness. Moreover, by steel-steel welding of the connecting plates 11 and the side plates, the weld strength between the plates can be improved. Indeed, the selection of materials for the body 10 and the connecting plates is not limited to the foregoing scheme. For example, the body 10 may employ plastic cement, which may be polyphenylene sulfide, fiber reinforced plastics (FRP) and the like.

There are various ways to connect the body 10 and the connecting plates 11, such as integrated injection molding. In order to improve structural strength of the end plate of the battery module, while to control its processing cost, the body 10 is provided with a mounting groove, which penetrates along the height direction of the battery module, and in which the connecting plates 11 is inserted. In this scheme, the body 10 and the connecting plates 11 are provided separately and then assembled together after being respectively processed. Such a structure can lead to a flexible processing for the body 10 and the connecting plates 11, and more effectively improve the connecting strength between them, thereby achieving the aforementioned purpose. In particular, the body 10 may be implemented by way of aluminum extrusion and machining, and the connecting plates 11 may be implemented by way of press forming.

Figure 3:
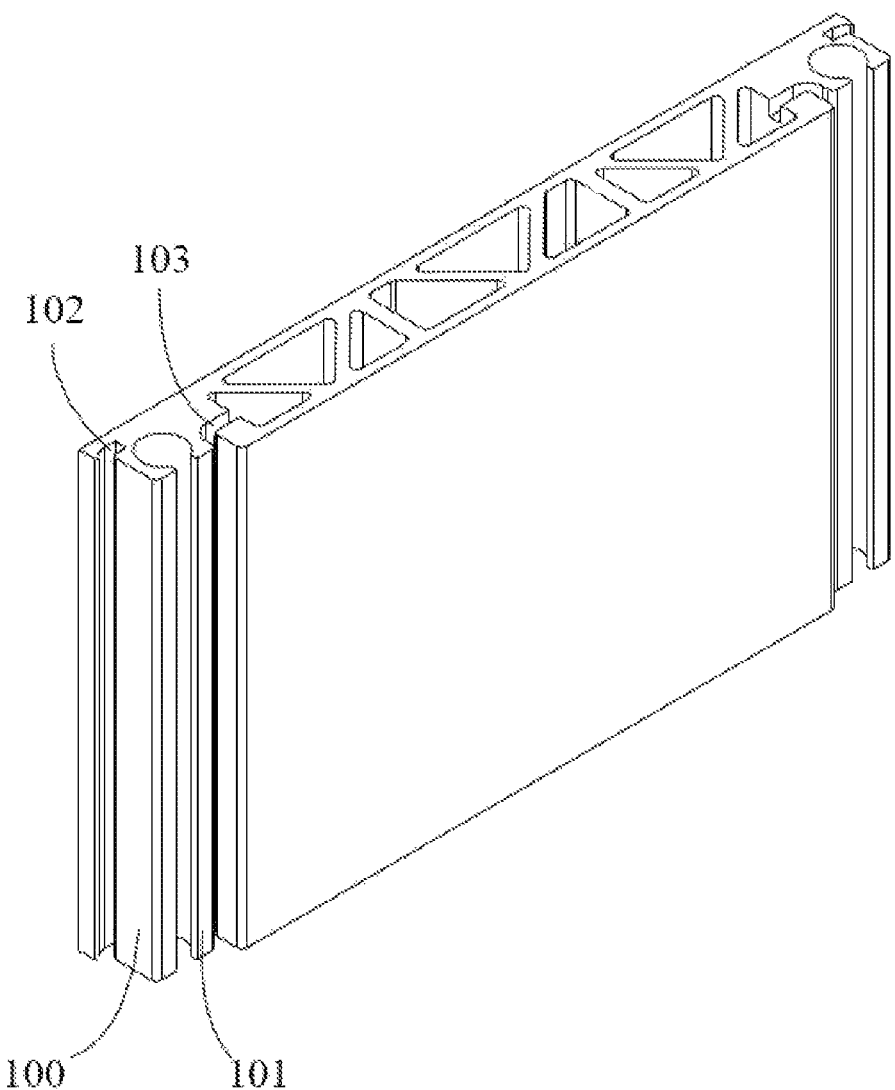
FIG. 3 is a structural schematic diagram of a body of the end plate of the battery module provided in an embodiment of the present application.
Figure 4:
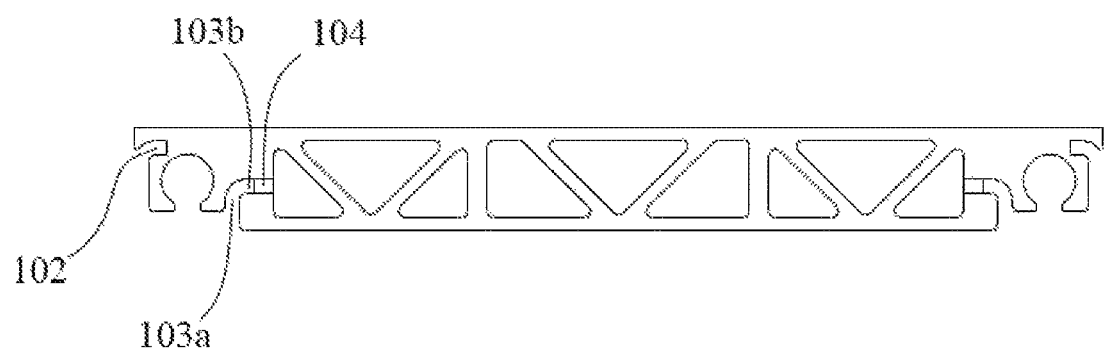
FIG. 4 is a top view of the structure illustrated in FIG. 3.
Figure 5:
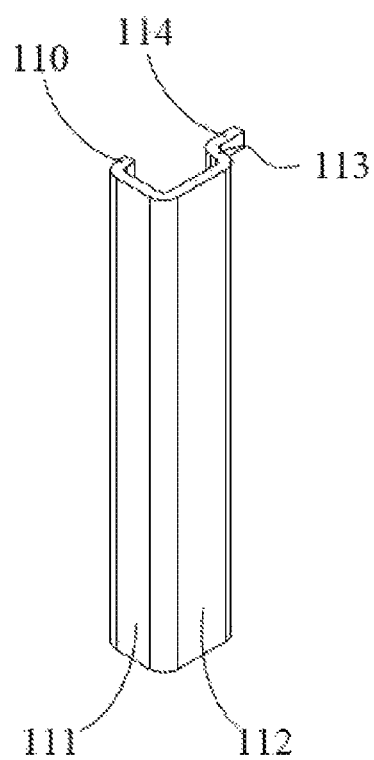
FIG. 5 is a structural schematic diagram of a connecting plate of the end plate of the battery module provided in an embodiment of the present application.
Figure 6:
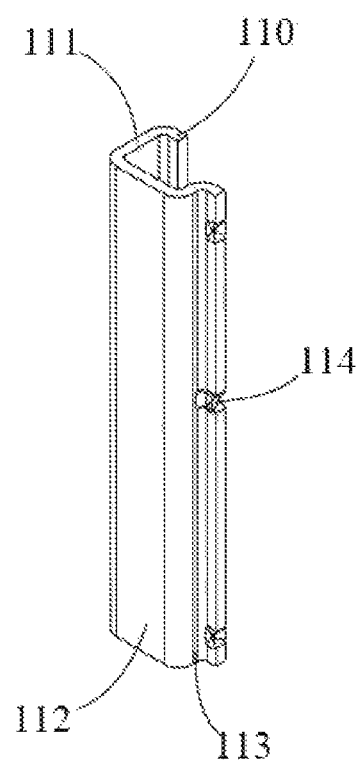
FIG. 6 is a structural schematic diagram of a connecting plate of the end plate of the battery module provided in another embodiment of the present application.

Further, as shown in FIG. 3, the body 10 has a first side surface 100 and a second side surface 101 which are joined together and extend along the height direction of the battery module. The mounting groove includes a first groove 102 and a second groove 103, which are opened in the first side surface 100 and the second side surface 101 respectively, and both of which penetrate along the height direction of the battery module. The opposite sides of connecting plates 11 are respectively inserted into the first groove 102 and the second groove 103. As shown in FIGS. 5 and 6, with such an arrangement, the connecting plate 11 may include a first inserted portion 110, a first exposed portion 111, a second exposed portion 112 and a second inserted portion 113, which are connected in turn. The first inserted portion 110 and the second inserted portion 113 are respectively inserted into the first groove 102 and the second groove 103. The first exposed portion 111 and the second exposed portion 112 are respectively exposed relative to the first groove 102 and the second groove 103, and may form a L-shaped structure. Such a structure results in relatively more connecting points between the connecting plates 11 and the body 10, and thus is able to improve the connection strength and the relative positioning accuracy between them.

Figure 7:
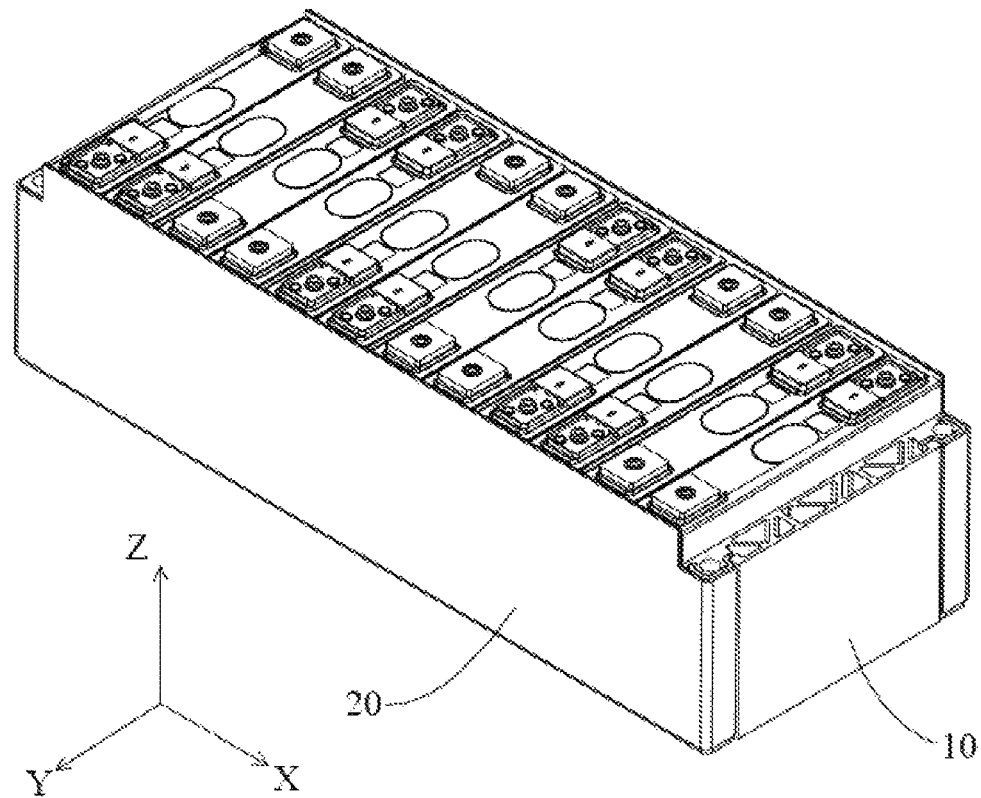
FIG. 7 is a structural schematic diagram of a battery module provided in an embodiment of the present application.

In order to further improve the relative positioning accuracy between the connecting plates 11 and the body 10, the first groove 102 may be recessed along a width direction of the battery module (i.e., Y and −Y directions as shown in the coordinate system in FIG. 7) with respect to the first side surface 100, in order for more effectively preventing the connecting plates 11 and the body 10 from shifting relatively along a length direction of the batter module (i.e., X and −X directions as shown in the coordinate system in FIG. 7).

For the structural design of the second groove 103, the following scheme is preferable by the embodiments of the present application. The second groove 103 includes a longitudinal groove segment 103a and a lateral groove segment 103b, both of which are connected with each other and penetrate along the height direction of the battery module. The longitudinal groove segment 103a is recessed along the length direction of the battery module with respect to the aforementioned second side surface 101, and the lateral groove segment 103b is recessed along the width direction of the battery module. As such, the relative shift and flip of the connecting plates 11 and the body 10 may be limited in both the length and width directions of the battery module at the same time by fitting of the second inserted portion 113 of the connecting plate 11 with the second groove 103, and thus the positioning accuracy between the connecting plates 11 and the body 10 can be greatly improved.

Upon the connecting plates 11 being inserted into the body 10, the bottom edge of connecting plates 11 can be aligned with that of the body 10, and thus the bottom plate of the battery module can be used to limit displacement between the connecting plates 11 and the body 10 in the height direction of the battery module. However, merely by this way, there is still a possibility that the connecting plates 11 move upwards with respect to the body 10. In order to prevent an occurrence of such a situation, the embodiments of the present application preferably employ the following way: the connecting plates 11 are in limiting fit with the body 10 in the height direction of the battery module. That is to say, the relative movement between the connecting plates 11 and the body 10 can be limited in two opposite directions along the height direction.

In an embodiment, a limiting protrusion 114 may be provided at an edge of the connecting plate 11. A limiting groove may be provided in the body 10, and generally connected to the mounting groove. The limiting protrusion 114 is in limiting fit with the limiting groove. In particular, the limiting protrusion 114 may protrude along the width direction of the battery module. As such (shown in FIG. 4), the limiting protrusion 114 is in limiting fit with the floor of the groove. More preferably, the limiting protrusion 114 may be provided at the top position of the connecting plate 11. Instead, the limiting protrusion 114 may protrude along the length direction of the battery module. As such, the limiting groove is also recessed along the length direction of the battery module. The limiting protrusion 114 and the limiting groove may be in transition fit with each other to strengthen the limiting effect. In addition, the latter way may further avoid molding the limiting groove in body 10 by machining, thus simplifying the procedure for processing the end plates of the battery module.

In case that the limiting protrusion 114 protrudes along the length direction of the battery module, there may be a plurality of the limiting protrusions 114, which are distributed at intervals along the height direction of the battery module. With such arrangement, the number of limiting fit points between the connecting plates 11 and the body 10 can be increased, while distribution of the limiting fit points can be optimized, so that the limiting effect of the limiting protrusion 114 will be more effective, and thereby the relative positioning accuracy between the connecting plates 11 and the body 10 can be improved. Further, at least two of the plurality of the limiting protrusions 114 protrude towards opposite directions, that is, protruding along X and −X directions as shown in FIG. 7 to make the limiting force between the connecting plate 11 and the body 10 more evenly distributed on both of them, preventing the connecting plate 11 and the body 10 from tilt, local deformation and the like due to unilateral stress.

According to the above structure, the embodiments of the present application further provide a battery module. The battery module includes side plates 20 and end plates fixedly connected with each other, and the end plates are implemented as the end plate of the battery module described in any of the embodiments discussed above.

The foregoing descriptions are merely the preferable embodiments of the present application and are not intended to limit the present application. Various changes and modifications may be made by those skilled in the art. Any modifications, equivalent substitutions, improvements, and the like within the spirit and principles of the application are intended to be included within the claimed scope of the present application.

What is claimed is:

1. An end plate of a battery module, comprising:
a body; and
connecting plates connected to edges of the body,
wherein the body has a different material from that of the connecting plate, the connecting plates extend along a height direction of the battery module, and the body is fixedly connected to side plates of the battery module through the connecting plates,
wherein the body is made of aluminum, the connecting plates are made of steel, and wherein the side plate is made of steel,
wherein the body is provided with a mounting groove which penetrates along the height direction of the battery module, and wherein the connecting plate is inserted into the mounting groove.

2. The end plate of the battery module of claim 1, wherein the body has a first side surface and a second side surface which are joined together and extend along the height direction of the battery module, and the mounting groove includes a first groove and a second groove, both of which penetrate along the height direction of the battery module and are provided in the first side surface and the second side surface respectively, and wherein the opposite sides of the connecting plate are inserted into the first groove and the second groove respectively.

3. The end plate of the battery module of claim 2, wherein the first groove is recessed along a width direction of the battery module.

4. The end plate of the battery module of claim 2, wherein the second groove includes a lateral groove segment and a longitudinal groove segment, both of which are connected with each other and penetrate along the height direction of the battery module, and wherein the lateral groove segment is recessed along a width direction of the battery module, and the longitudinal groove segment is recessed along a length direction of the battery module.

5. The end plate of the battery module of any of claim 1, wherein the connecting plates are in limiting fit with the body in the height direction of the battery module.

6. The end plate of the battery module of claim 5, wherein a limiting protrusion is provided at an edge of the connecting plate, and a limiting groove is provided in the body, and the limiting protrusion is in limiting fit with the limiting groove in the height direction of the battery module.

7. The end plate of the battery module of claim 5, wherein the limiting protrusion protrudes along one of the width direction of the battery module and the length direction of the battery module.

8. The end plate of the battery module of claim 7, wherein the limiting protrusion protrudes along the length direction of the battery module, and there are a plurality of the limiting protrusions, which are distributed at intervals along the height direction of the battery module.

9. The end plate of the battery module of claim 8, wherein at least two of the limiting protrusions protrude toward opposite directions.

10. A battery module comprising side plates and end plates, wherein the end plates are fixedly connected to the side plates, and the end plates comprises:
a body; and
connecting plates connected to edges of the body,
wherein the body has a different material from that of the connecting plate, the connecting plates extend along a height direction of the battery module, and the body is fixedly connected to side plates of the battery module through the connecting plates,
wherein the body is made of aluminum, the connecting plates are made of steel, and wherein the side plate is made of steel,
wherein the body is provided with a mounting groove which penetrates along the height direction of the battery module, and wherein the connecting plate is inserted into the mounting groove.

11. The battery module of claim 10, wherein the body has a first side surface and a second side surface which are joined together and extend along the height direction of the battery module, and the mounting groove includes a first groove and a second groove, both of which penetrate along the height direction of the battery module and are provided in the first side surface and the second side surface respectively, and wherein the opposite sides of the connecting plate are inserted into the first groove and the second groove respectively.

12. The battery module of claim 11, wherein the first groove is recessed along a width direction of the battery module.

13. The battery module of claim 11, wherein the second groove includes a lateral groove segment and a longitudinal groove segment, both of which are connected with each other and penetrate along the height direction of the battery module, and wherein the lateral groove segment is recessed along a width direction of the battery module, and the longitudinal groove segment is recessed along a length direction of the battery module.

14. The battery module of any of claim 10, wherein the connecting plates are in limiting fit with the body in the height direction of the battery module.

15. The battery module of claim 14, wherein a limiting protrusion is provided at an edge of the connecting plate, and a limiting groove is provided in the body, and the limiting protrusion is in limiting fit with the limiting groove in the height direction of the battery module.

16. The battery module of claim 14, wherein the limiting protrusion protrudes along one of the width direction of the battery module and the length direction of the battery module.

* * * * *

UNITED STATES PATENT AND TRADEMARK OFFICE
CERTIFICATE OF CORRECTION

PATENT NO. : 10,629,868 B2
APPLICATION NO. : 15/657797
DATED : April 21, 2020
INVENTOR(S) : Gen Cao Page 1 of 1

It is certified that error appears in the above-identified patent and that said Letters Patent is hereby corrected as shown below:

On the Title Page

(71) Applicant:
Please delete "Contemporary Amperex Technology Co.," and insert --Contemporary Amperex Technology Co., Limited-- therefor.

Signed and Sealed this
Second Day of June, 2020

Andrei Iancu
*Director of the United States Patent and Trademark Office*